United States Patent
Zarkhin et al.

(10) Patent No.: US 9,825,527 B2
(45) Date of Patent: *Nov. 21, 2017

(54) PWM GENERATION FOR DC/DC CONVERTERS WITH FREQUENCY SWITCHING

(71) Applicant: Continental Automotive Systems, Inc., Auburn Hills, MI (US)

(72) Inventors: Mikhail Zarkhin, West Bloomfield, MI (US); Alfons Fisch, Falkenstein (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 128 days.

This patent is subject to a terminal disclaimer.

(21) Appl. No.: 14/457,636

(22) Filed: Aug. 12, 2014

(65) Prior Publication Data

US 2016/0049869 A1   Feb. 18, 2016

(51) Int. Cl.
  *H02M 3/156*   (2006.01)
  *H02M 3/158*   (2006.01)
  *H02M 3/155*   (2006.01)

(52) U.S. Cl.
  CPC ............ *H02M 3/156* (2013.01); *H02M 3/158* (2013.01); *H02M 2003/1557* (2013.01)

(58) Field of Classification Search
  CPC ......... H02M 2003/1557; H02M 3/158; H02M 3/1582; H02M 3/1588; H03K 5/00006; H03K 7/08; H02K 37/06
  See application file for complete search history.

(56) References Cited

U.S. PATENT DOCUMENTS

| 5,479,329 | A  | * | 12/1995 | Motonobu | G01R 31/42 363/15 |
| 6,211,623 | B1 | * | 4/2001 | Wilhelm | H05B 41/2983 315/224 |
| 6,348,780 | B1 | * | 2/2002 | Grant | H02M 3/156 323/222 |
| 6,965,223 | B1 | * | 11/2005 | MacLean | H02M 1/36 323/276 |
| 7,821,244 | B1 | * | 10/2010 | Signoretti | H02M 3/158 323/271 |
| 2003/0080715 | A1 | * | 5/2003 | Peter | H02P 9/30 322/25 |

(Continued)

OTHER PUBLICATIONS

C. Tao and A. A. Fayed, "A Buck Converter With Reduced Output Spurs Using Asynchronous Frequency Hopping," in IEEE Transactions on Circuits and Systems II: Express Briefs, vol. 58, No. 11, pp. 709-713, Nov. 2011.*

*Primary Examiner* — Harry Behm
*Assistant Examiner* — Peter Novak

(57) ABSTRACT

A method and apparatus for generating a pulse width modulation (PWM) control signal generates a sawtooth ramp signal at a first frequency under standard operating conditions using a ramp generator, and generates a sawtooth ramp at a second frequency under alternative operating conditions. The sawtooth ramp is combined with an error threshold by a PWM controller to generate a square wave PWM control signal. The error threshold is adjusted simultaneous with adjusting the frequency of the sawtooth ramp, thereby preventing either a voltage overshoot and a voltage undershoot.

19 Claims, 3 Drawing Sheets

(56) References Cited

U.S. PATENT DOCUMENTS

| | | | | |
|---|---|---|---|---|
| 2006/0034403 A1* | 2/2006 | Huang | ................... | H03L 7/10 375/354 |
| 2010/0053999 A1* | 3/2010 | Jang | ..................... | H02M 1/08 363/21.01 |
| 2011/0316511 A1* | 12/2011 | Wang | .................. | H02M 3/156 323/285 |
| 2013/0002212 A1* | 1/2013 | Fan | ................... | H02M 3/1588 323/235 |
| 2014/0091774 A1* | 4/2014 | Srinivasan | ............ | H02M 3/158 323/271 |
| 2014/0211192 A1* | 7/2014 | Grootjans | .......... | H05B 33/0818 356/5.01 |

* cited by examiner

PWM GENERATION FOR DC/DC CONVERTERS WITH FREQUENCY SWITCHING

BACKGROUND OF THE INVENTION

The present disclosure relates generally to Pulse Width Modulation (PWM) controllers and more particularly to single-ended primary-inductance converters (SEPICs) including frequency switching functions for a PWM control signal.

(PWM) is widely used to control switch mode power supplies, such as the power supplies that are found in automotive systems. A typical approach used to generate PWM control signals uses a flip-flop, comparator and a ramp generator. At the beginning of each ramp up from the ramp generator, the output of the flip-flop is set to on, resulting in a high voltage output. The comparator resets the flip-flop to off when the output of the ramp generator exceeds a predefined threshold (when the ramp up exceeds the threshold). The threshold is defined by an error amplifier that is part of a feedback control loop within the control system or defined in a controller. This process repeats at a fixed frequency generating a square wave output from the flip-flop. The square wave output functions as the PWM control signal.

In some instances, the PWM frequency is adjusted to compensate for operating conditions of a DC/DC converter used as part of the aforementioned ramp generator. Operating conditions that can require this adjustment are sudden changes to the input voltage of the DC/DC converter, the output voltage of the DC/DC converter, a connected load, or any other similar operating condition.

One type of DC/DC converter that is frequently utilized in PWM systems is a single-ended primary-inductor converter (alternately referred to as a SEPIC). PWM SEPICs typically include a compensation loop design that keeps the system stable when the converter is operating in a discontinuous conduction mode. When the input voltage to the converter decreases below a predefined threshold, the operating frequency of the converter is decreased in order to keep a power stage of the SEPIC stable. If the peak and valley values of the sawtooth signal remain the same (i.e. the slope of the sawtooth is adjusted proportional to the ratio of frequencies) then the operating frequency change causes an overshoot or undershoot. Similarly, when the frequency is increased after the input voltage exceeds the predefined threshold, there is a corresponding undershoot at the SEPIC output voltage.

SUMMARY OF THE INVENTION

Disclosed is a method for generating a pulse width modulation (PWM) control signal comprising the steps of: generating a sawtooth ramp signal at a first frequency under standard operating conditions using a ramp generator, generating a PWM square wave having a rising edge at a falling edge of the sawtooth ramp signal and a falling edge when the sawtooth ramp signal exceeds an error threshold, adjusting the frequency of the sawtooth ramp in response to a changed operating parameter of the SEPIC, and adjusting the error threshold of the error amplifier simultaneous with adjusting the frequency of the sawtooth ramp, thereby preventing one of a voltage overshoot and a voltage undershoot.

Also disclosed is a pulse width modulation (PWM) controlled power stage comprising: a voltage source, a pulse width modulation controller including a ramp generator operable to generate a sawtooth ramp and a threshold input operable to receive voltage threshold from an error amplifier, wherein the pulse width modulation controller is operable to output a pulse width modulation control signal, a power stage operable to receive the pulse width modulated control signal and output a voltage, a comparator having a first input connected to the voltage source and a second input connected to a reference voltage such that the comparator compares the output of the voltage source against the reference voltage, the comparator further comprising an output operable to control at least a first switch and a second switch, wherein the first switch is operable to set a frequency of the sawtooth ramp, and wherein the second switch is operable to activate a voltage divider connecting the output of the error amplifier to the threshold input of the pulse width modulation controller, wherein the voltage divider is inactive when the sawtooth ramp is a first frequency and wherein the voltage divider is active when the sawtooth ramp is a second frequency.

These and other features of the present invention can be best understood from the following specification and drawings, the following of which is a brief description.

DETAILED DESCRIPTION OF AN EMBODIMENT

Figure 1:
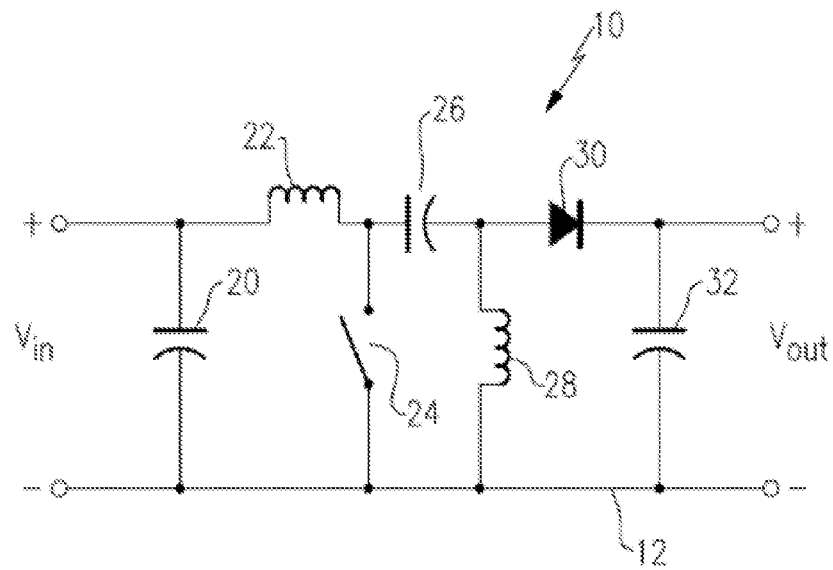
FIG. 1 schematically illustrates a single-ended primary-inductance converter (SEPIC).

FIG. 1 schematically illustrates a power stage 10 that operates as a DC/DC converter. The power stage 10 includes an input voltage $V_{in}$ and an output voltage $V_{out}$. Parallel to the input voltage $V_{in}$ is a capacitor 20. An inductor 22 is connected to a positive terminal of the capacitor 20, and to a positive terminal of a switch 24. The switch 24 connects the first inductor 22 to a negative voltage return line 12. A second capacitor 26 is connected at one end to the first inductor 22, and at a second end to a second inductor 28. The second end of the second inductor 28 is connected to the negative voltage return line 12. A cathode end of a diode 30 is connected to the node joining the second capacitor 26 and the second inductor 28. A third capacitor 32 connects the anode end of the diode 30 to the negative voltage return line 12. The third capacitor 32 is parallel to an output voltage $V_{out}$ of the power stage 10.

Figure 2:
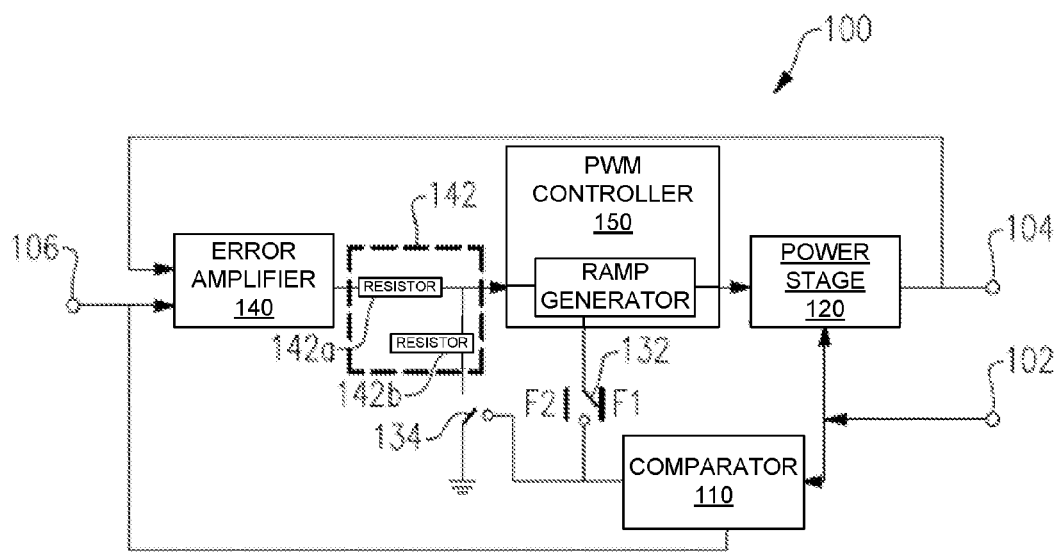
FIG. 2 schematically a Pulse Width Modulation (PWM) controller and a power stage.

In the example power stage 10, the power stage 10 is connected to and controlled by a PWM controller. FIG. 2 illustrates an example circuit 100 including a PWM controller 150 for controlling a power stage 102. The circuit 100 includes a first voltage input 102 connected to a voltage source, a voltage output 104 ($V_{out}$) of the power stage 102, and a reference voltage input 106. The first voltage input 102 is compared to the reference voltage 106 in a comparator 110, and the output of the comparator 110 controls a set of switches 132, 134. The switches 132, 134 function to transition the circuit 100 between a control mode corresponding to a first frequency F1, and a control mode corresponding to a second frequency F2.

The voltage output 104 ($V_{out}$) is connected to an error amplifier 140 that sets an error voltage ($V_e$) threshold for the PWM controller 150. The error amplifier 140 compares $V_{out}$ to the reference voltage 106 and magnifies the difference between the values according to a known gain. In the illustrated example, a single reference voltage 106 is utilized for the circuit 100, however in alternate examples the reference voltages 106 can be distinct voltage levels and are connected to distinct reference voltage sources.

The output of the error amplifier 140 is passed to the PWM controller 150. The PWM controller 150 utilizes the output of the error amplifier 140 in combination with an internally generated sawtooth ramp to create a PWM output that is provided to, and controls, the power stage 102. The internally generated sawtooth ramp is generated using a known sawtooth generator contained within the PWM controller 150.

In the illustrated examples of FIGS. 1 and 2, whenever the input voltage $V_{in}$ decreases below a predefined threshold, the operating frequency of the power stage 10, 120 is decreased by the comparator 110. This frequency adjustment maintains the power stage 10, 120 in a discontinuous mode of operations. The sawtooth voltage $V_{saw}$ of the power stage 10, 120 changes in this manner whenever an abrupt change in the system input voltage occurs. These types of abrupt changes are frequent in some automotive systems.

Figure 3:
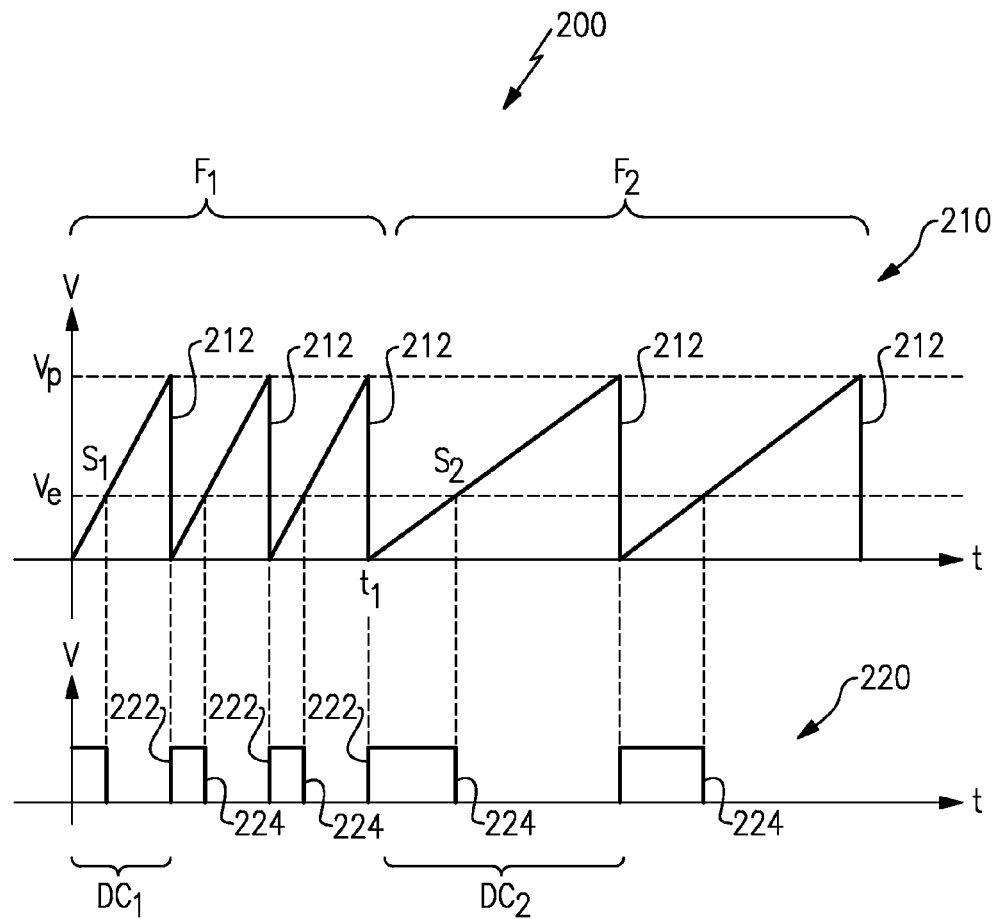
FIG. 3 schematically illustrates a plot of a sawtooth ramp signal and a corresponding PWM output signal maintaining a constant peak input voltage.

FIG. 3 illustrates a chart 200 showing an internal sawtooth ramp voltage 210 and a PWM control signal output 220 of the PWM controller 150 illustrated in FIG. 2. The chart 200 reflects a decrease in the operating frequency at time $t_1$ resulting from an abrupt input voltage change. In response to the input voltage change, the operating frequency of the SEPIC in the PWM controller 150 is adjusted by the comparator 110 from a first frequency (F1) to a second, lower frequency (F2) at time $t_1$ by a given factor ("K") in order to maintain the power stage in discontinuous mode. The given factor "K" is F1/F2. As the slope S1, S2 of the sawtooth ramp is a function of the frequency F1, F2 and the peak sawtooth voltage, the slope S1 of the sawtooth ramp is similarly adjusted to a new slope S2 when the frequency changes. The new ramp slope S2 is equal to the old ramp slope S1 divided by the factor K (S1/K). Thus if the original operating frequency F1 is halved (adjusted by a factor of 2) at time $t_1$, the new slope S2 of the sawtooth ramp is ½ of the previous slope S1.

The PWM controller 150 generates a square wave pulse signal with a rising edge 222 of the square wave triggered by the falling edge 212 of the sawtooth waveform 210. The falling edge 224 of the square wave pulse signal is triggered by the sawtooth waveform 210 exceeding a pre-defined error voltage threshold $V_e$. The error voltage threshold $V_e$ is set using the error amplifier 140 circuit incorporated into the circuit 100.

Assuming that the error voltage threshold $V_e$ is not changed when the operating frequency shifts from the first operating frequency F1 to the second operating frequency F2, maintaining a constant sawtooth voltage $V_{saw}$ causes the duty cycle DC1 of the PWM signal at the first frequency F1 and the duty cycle DC2 of the PWM signal at the second frequency to remain the same. As is understood by those of skill in the art of PWM controls, the duty cycle of a PWM signal is the percentage of each period that the square wave, or pulse, is high. The equality of the duty cycles DC1, DC2 and the alteration of the slopes S1, S2 in the above described system causes the output voltage to overshoot when the SEPIC switches to a lower operating frequency and the output voltage to undershoot when the SEPIC switches to a higher operating frequency.

In SEPIC converters operating in discontinuous mode, such as the SEPIC converter included in the PWM controller 150 of FIG. 2, the duty cycle is defined not only by the input voltage $V_{in}$ and the output voltage $V_{out}$, but also by converter output power. During steady state operations, the SEPIC output power combined with efficiency losses should be equal to the SEPIC input power. When the SEPIC output power does not equal the SEPIC input power minus efficiency losses, then the SEPIC is not in steady state operations. One prime example of such a condition is during either a voltage undershoot or a voltage overshoot.

When the output voltage Ve of the error amplifier 140 is fixed, such as in the example of FIG. 3, the input cycle energy is proportional to the second power of the ON time of the PWM signal (i.e., the second power of the duty cycle DC1, DC2). The converter output power is the product of the output cycle energy and the operating frequency of the power stage. When the operating frequency changes from F1 to F2 by a factor of K, the output cycle energy also should change by a factor of K, but in the reverse direction, in order to maintain a stable output. For example, if the second frequency F2 is twice the first frequency F1, then the output cycle energy is halved during the second frequency F2 operations.

With the above understanding, it can be appreciated that when the duty cycle DC2 at the second frequency is equal to the duty cycle DC1 at the first frequency, then the ON time and the peak current of the power stage 102 also changes by a factor of K. This, in turn, causes the input cycle energy to be changed by a factor of K*K. Thus, when the frequency is decreased, the input cycle energy is increased in excess of what is necessary to maintain the output power. This results in a voltage overshoot for the duration of time required for the feedback loop within the PWM controller 150 to decrease the duty cycle to compensate for the adjusted frequency F1, F2.

It is further appreciated that maintaining a constant duty cycle within a PWM signal is not a requirement for achieving proper PWM controls. In the illustrated circuit 100 of FIG. 2, and power stage 10 of FIG. 1, the circuit 100 prevents voltage undershoots and overshoots during this duration by adjusting the output of the error amplifier 140 using a voltage divider 142. Adjusting the output of the error amplifier 140 alters the position of the falling edge 224, thereby altering the duty cycle. The voltage divider 142 can be switched into the circuit simultaneous with the adjusting the input frequency F1, F2 from the first frequency F1, to the second frequency F2, using the output of the comparator 110.

Figure 4:
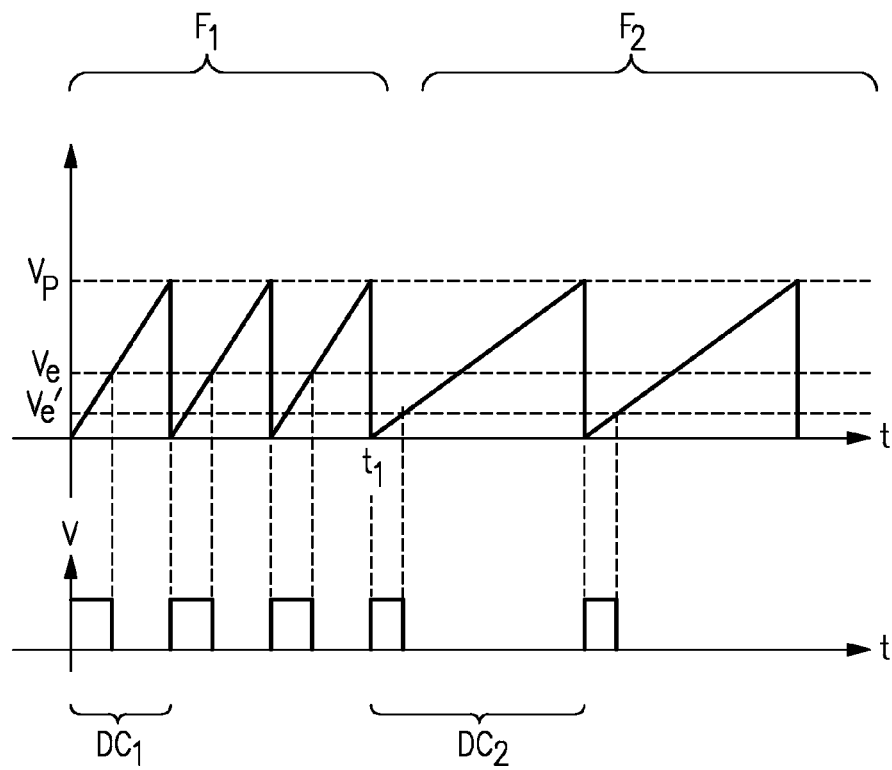
FIG. 4 illustrates a plot of a sawtooth ramp signal and a corresponding PWM output signal including adjustments on an error amplifier voltage.

FIG. 4 illustrates a plot of the sawtooth ramp signal and a corresponding PWM output signal including error amplifier output voltage Ve adjustments made by the comparator 110. Unlike the PWM generation scheme illustrated in FIG. 3, when the comparator 110 adjusts the frequency of the sawtooth ramp signal 310, the output of the error amplifier 140 is adjusted from an initial voltage output Ve corresponding to the first operating frequency F1 to a second voltage output Ve' corresponding to the second operating frequency F2 using the voltage divider 142. By decreasing the output voltage of the error amplifier alongside a decrease in the frequency F2, the decrease in the slope of the sawtooth ramp between the first frequency and the second frequency is decreased by a factor of the square root of the factor K by which the frequency was adjusted (i.e., sqrt(K)) instead of being decreased by a factor of K.

In order to achieve the smaller duty cycle described above, the voltage output of the error amplifier is also decreased by a factor of the square root of the factor K, where K is the factor by which the frequency was adjusted. In other words, Ve'=Ve*1/sqrt(K), where Ve' is the adjusted error amplifier output, Ve is the original error amplifier output, and K is the factor by which the frequency is adjusted from the first frequency F1 to the second frequency F2. In order to achieve the Ve*1/sqrt(K) factor, the resistances of the resistors 142*a*, 142*b* in the voltage divider 142 are selected such that 142*b*/(142*a*+142*b*)=1/sqrt(K).

As a further result of changing the voltage output of the error amplifier, the duty cycle of the PWM signal is also changed, and is not maintained constant between the first frequency F1 and the second frequency F2. The new duty cycle of the PWM signal at the second frequency F2 is equal to the duty cycle of the PWM signal at the first frequency F1 multiplied by the square root of the factor K. The utilization of multiple varied duty cycles within a single PWM signal is known in the art, and the adjusted duty cycle does not degrade the performance of the PWM signal.

As described above, when the ON time of the PWM signal and the peak current of the SEPIC changes by a factor of K, the resultant input cycle energy is changed by a factor of K*K. By adjusting the voltage output of the error amplifier in the manner described above, however, the ON time of the PWM signal (the duty cycle DC1, DC2) is adjusted by a factor of the square root of K. This adjustment results in the input cycle energy being adjusted by a factor of K. Therefore, adjusting the voltage output of the error amplifier 140 in the above described manner causes the input cycle energy to change by a factor of K, instead of a factor of K squared. This corrected adjustment maintains the steady state operations of the SEPIC and eliminates output voltage overshoot or undershoot when the operating frequency of the SEPIC is changed.

Figure 5:
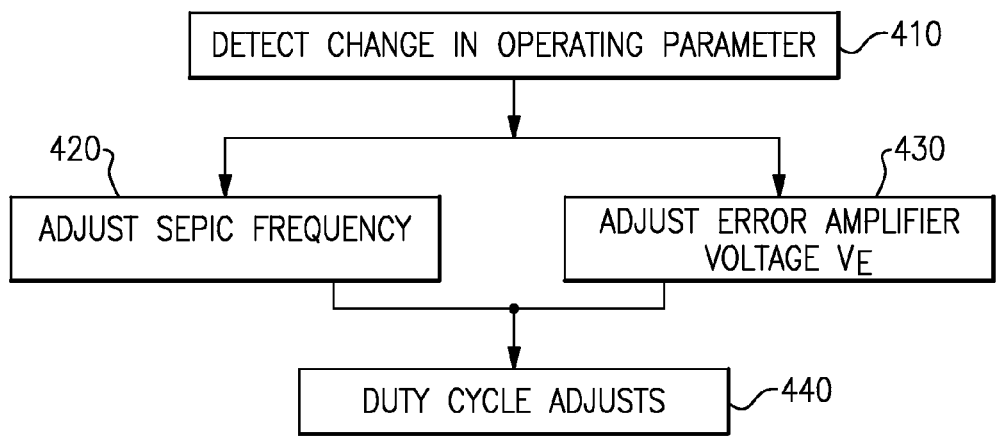
FIG. 5 illustrates a flowchart of a practical operation of the PWM controller of FIG. 2.

With continued reference to FIG. 2, and with like numerals indicating like elements, described below, and illustrated in FIG. 5, is a practical operation of the circuit 100, illustrated in FIG. 2, when the PWM controller 150 undergoes a frequency adjustment. Initially, a sharp change in an operating parameter, such as a decrease in available input voltage, occurs in a "detect change in operating parameter" step 410. Upon detection of the sharp decrease in the input voltage the comparator 110 compensates for the decreased available input voltage by adjusting the frequency of the PWM controller 150 to have a longer period in an "Adjust SEPIC Frequency" step 420. Simultaneous with adjusting the frequency, the comparator 110 adjusts the output voltage Ve of the error amplifier in an "Adjust Error Amplifier Voltage Ve" step 430. The adjusted output voltage Ve is then combined with the sawtooth wave to generate the PWM control. As described above, the new error amplifier voltage output Ve is decreased by a factor of the square root of the factor by which the frequency was increased.

As a result of the decreased frequency and the decreased error amplifier output voltage Ve', the duty cycle of the pulse signal generated by the PWM controller 150 self adjusts in a "Duty Cycle Adjusts" step 440. The amount of the duty cycle adjustment depends on both the SEPIC frequency adjustment and the error amplifier output voltage Ve' adjustment. As the error amplifier 140 output voltage Ve' is adjusted by the square root of the factor by which the frequency is adjusted, the Duty Cycle is also adjusted by the square root of the factor by which the frequency was adjusted.

Because the duty cycle self adjusts corresponding to the adjusted SEPIC frequency and the error amplifier voltage, overshoots and undershoots of the output voltage are prevented and the SEPIC converter is maintained in the discontinuous mode.

While described above with regards to a single frequency shift from a first frequency F1 of a second frequency F2, one of skill in the art having the benefit of this disclosure will understand that the principles can be extended to a system including multiple additional possible frequencies by switching in alternative or additional voltage dividers and thereby adjusting the error amplifier output voltage to compensate for each potential frequency level.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for generating a pulse width modulation (PWM) control signal comprising:
    generating a sawtooth ramp signal at a first frequency under standard operating conditions using a ramp generator;
    generating a PWM square wave having a rising edge at a falling edge of the sawtooth ramp signal and a falling edge when the sawtooth ramp signal exceeds an error threshold;
    adjusting the frequency of the sawtooth ramp signal in response to a changed operating parameter of the ramp generator; and
    adjusting the error threshold applied to the sawtooth ramp signal simultaneous with adjusting the frequency of the sawtooth ramp signal, thereby preventing one of a voltage overshoot and a voltage undershoot,
    wherein adjusting the frequency of the sawtooth ramp signal comprises adjusting the frequency by a first factor, and adjusting the error threshold applied to the sawtooth ramp signal comprises adjusting the error threshold by a second factor, and
    wherein the second factor is the square root of the first factor.

2. The method of claim 1, wherein the changed operating parameter of the ramp generator is at least one of an increase in a load, a decrease in a load, and a decrease in an available input power.

3. The method of claim 1, wherein generating a sawtooth ramp signal at a first frequency under standard operating conditions using a ramp generator comprises utilizing a single-ended primary-inductance converter (SEPIC) to generate the sawtooth ramp signal.

4. The method of claim 3, further comprising maintaining the SEPIC in a discontinuous mode and thereby maintaining a stability of the SEPIC.

5. The method of claim 4, wherein the step of maintaining the SEPIC in a discontinuous mode is performed utilizing a compensation loop.

6. The method of claim 1, wherein
the first factor and the second factor are related to each other such that one of the first factor is based upon the second factor and the second factor is based upon the first factor.

7. The method of claim 1, wherein a positive peak and a negative peak of the sawtooth ramp signal are constant.

8. The method of claim 2, wherein adjusting the frequency of the sawtooth ramp signal and adjusting the error threshold applied to the sawtooth ramp signal result in a duty cycle of the generated PWM square wave signal being adjusted by the first factor.

9. A pulse width modulation (PWM) controlled power stage comprising:
a voltage source;
a pulse width modulation controller including a ramp generator operable to generate a sawtooth ramp and a threshold input operable to receive a voltage threshold from an error amplifier, wherein the pulse width modulation controller is operable to output a pulse width modulation control signal;
a power stage operable to receive said pulse width modulated control signal and output a voltage;
a comparator having a first input connected to the voltage source and a second input connected to a reference voltage such that said comparator compares the output of the voltage source against the reference voltage;
said comparator further comprising an output operable to control at least a first switch and a second switch, wherein said first switch is operable to set a frequency of said sawtooth ramp, and wherein said second switch is operable to activate a voltage divider connecting the output of the error amplifier to the threshold input of the pulse width modulation controller;
wherein the voltage divider is inactive when said sawtooth ramp is a first frequency and wherein said voltage divider is active when said sawtooth ramp is a second frequency.

10. The pulse width modulation (PWM) controlled power stage of claim 9, wherein said error amplifier comprises an error amplifier reference voltage input and a feedback input and is operable to output an error voltage dependent upon a difference between said reference voltage and said feedback input.

11. The pulse width modulation (PWM) controlled power stage of claim 9, wherein said voltage divider is operable to adjust the voltage threshold of the pulse width modulation controller by a first factor, and wherein the comparator is operable to adjust the frequency of the ramp generator by a second factor.

12. The pulse width modulation (PWM) controlled power stage of claim 11, wherein the first factor is a square root of the second factor.

13. The pulse width modulation (PWM) controlled power stage of claim 11, wherein a duty cycle of a generated PWM signal is adjusted by the first factor simultaneous with the frequency adjustment.

14. The pulse width modulation (PWM) controlled power stage of claim 9, wherein the first switch comprises a switch network operable to select a sawtooth ramp frequency from at least three possible sawtooth ramp frequencies.

15. The pulse width modulation (PWM) controlled power stage of claim 9, wherein the second switch comprises a switch network including multiple switches, and wherein each switch in said switch network is operable to activate one of a plurality of voltage dividers.

16. The pulse width modulation (PWM) controller power stage of claim 15, wherein each of said plurality of voltage dividers is active when at least one corresponding sawtooth ramp frequency is selected.

17. A method for generating a pulse width modulation (PWM) control signal comprising:
generating a sawtooth ramp signal at a first frequency under standard operating conditions using a ramp generator;
generating a PWM square wave having a rising edge at a falling edge of the sawtooth ramp signal and a falling edge when the sawtooth ramp signal exceeds an error threshold;
adjusting the frequency of the sawtooth ramp signal in response to a changed operating parameter of the ramp generator; and
adjusting the error threshold applied to the sawtooth ramp signal simultaneous with adjusting the frequency of the sawtooth ramp signal, thereby preventing one of a voltage overshoot and a voltage undershoot,
wherein generating a sawtooth ramp signal at a first frequency under standard operating conditions using a ramp generator comprises utilizing a single-ended primary-inductance converter (SEPIC) to generate the sawtooth ramp signal.

18. The method of claim 17, further comprising maintaining the SEPIC in a discontinuous mode and thereby maintaining a stability of the SEPIC.

19. The method of claim 18, wherein the step of maintaining the SEPIC in a discontinuous mode is performed utilizing a compensation loop.

* * * * *